(12) United States Patent
Bradley et al.

(10) Patent No.: US 12,561,424 B2
(45) Date of Patent: Feb. 24, 2026

(54) INSTALLATION OF A BOUND PACKAGE ON A SECURITY MODULE

(71) Applicant: Kigen (UK) Limited, Cambridge (GB)

(72) Inventors: Paul David Bradley, Allauch (FR); Said Gharout, Paris (FR)

(73) Assignee: Kigen (UK) Limited, Cambridge (GB)

( * ) Notice: Subject to any disclaimer, the term of this patent is extended or adjusted under 35 U.S.C. 154(b) by 146 days.

(21) Appl. No.: 18/495,080

(22) Filed: Oct. 26, 2023

(65) Prior Publication Data

US 2024/0202310 A1 Jun. 20, 2024

(30) Foreign Application Priority Data

Dec. 20, 2022 (EP) .................................... 22306951

(51) Int. Cl.
G06F 21/45 (2013.01)
G06F 21/00 (2013.01)

(52) U.S. Cl.
CPC .................................... G06F 21/45 (2013.01)

(58) Field of Classification Search
CPC .......... G06F 21/45; G06F 21/30; G06F 21/44; G06F 21/445; G06F 21/60; G06F 21/602; G06F 21/604; G06F 21/62; H04W 12/30; H04W 12/35; H04W 12/40; H04W 12/42; H04W 12/48
See application file for complete search history.

(56) References Cited

U.S. PATENT DOCUMENTS

| | | | |
|---|---|---|---|
| 9,831,903 B1 * | 11/2017 | Narasimhan | ........ H04M 17/023 |
| 2019/0075453 A1 | 3/2019 | Yoon et al. | |
| 2020/0236546 A1 | 7/2020 | Yu et al. | |
| 2022/0006625 A1 | 1/2022 | Nix | |
| 2022/0360978 A1 * | 11/2022 | Li | ........................ H04W 12/40 |

FOREIGN PATENT DOCUMENTS

WO 2022/083946 4/2022

OTHER PUBLICATIONS

Extended European Search Report for EP22306951.9, dated May 12, 2023, 11 pages.
GSM Association, "Embedded SIM Remote Provisioning Architecture", Version 4.3, Industry Specification, Official Document SGP. 01, Nov. 18, 2022, 109 pages.
GSM Association, "Remote Provisioning Architecture for Embedded UICC", Technical Specification, Version 4.2.1, Official Document SGP.02-SGP.02, Nov. 26, 2021, 447 pages.

(Continued)

*Primary Examiner* — Edward Zee

(74) *Attorney, Agent, or Firm* — NIXON & VANDERHYE P.C.

(57) ABSTRACT

A method, computer program, and apparatus install a given bound package on a given security module. A plurality of bound packages (BPs) corresponding to a plurality of security-module identifiers (IDs) are received. Each BP corresponds to a corresponding ID. The given BP and a given ID corresponding to the given BP are selected for a given security module manufactured without an associated ID. The given ID, a given set of credentials corresponding to the given ID, and the given BP are provided for installation on the given security module.

15 Claims, 6 Drawing Sheets

(56) References Cited

OTHER PUBLICATIONS

GSM Association, "RSP Architecture", Version 3.0, Official Document SGP.21—RSP Architecture, Mar. 28, 2022, 145 pages, retrieved from the Internet: URL: https://www.gsma.com/esim/wp-content/uploads/2022/03/SGP.21-V3.0.pdf.
GSM Association, "RSP Technical Specification", Version 3.0, Oct. 19, 2022, 483 pages.
GSM Association, "SGP.31 eSIM IoT Architecture and Requirements", Version 1.0, Apr. 19, 2022, 59 pages.
Office Action for TW Application No. 112144507 issued May 31, 2024 and English translation, 34 pages.

* cited by examiner

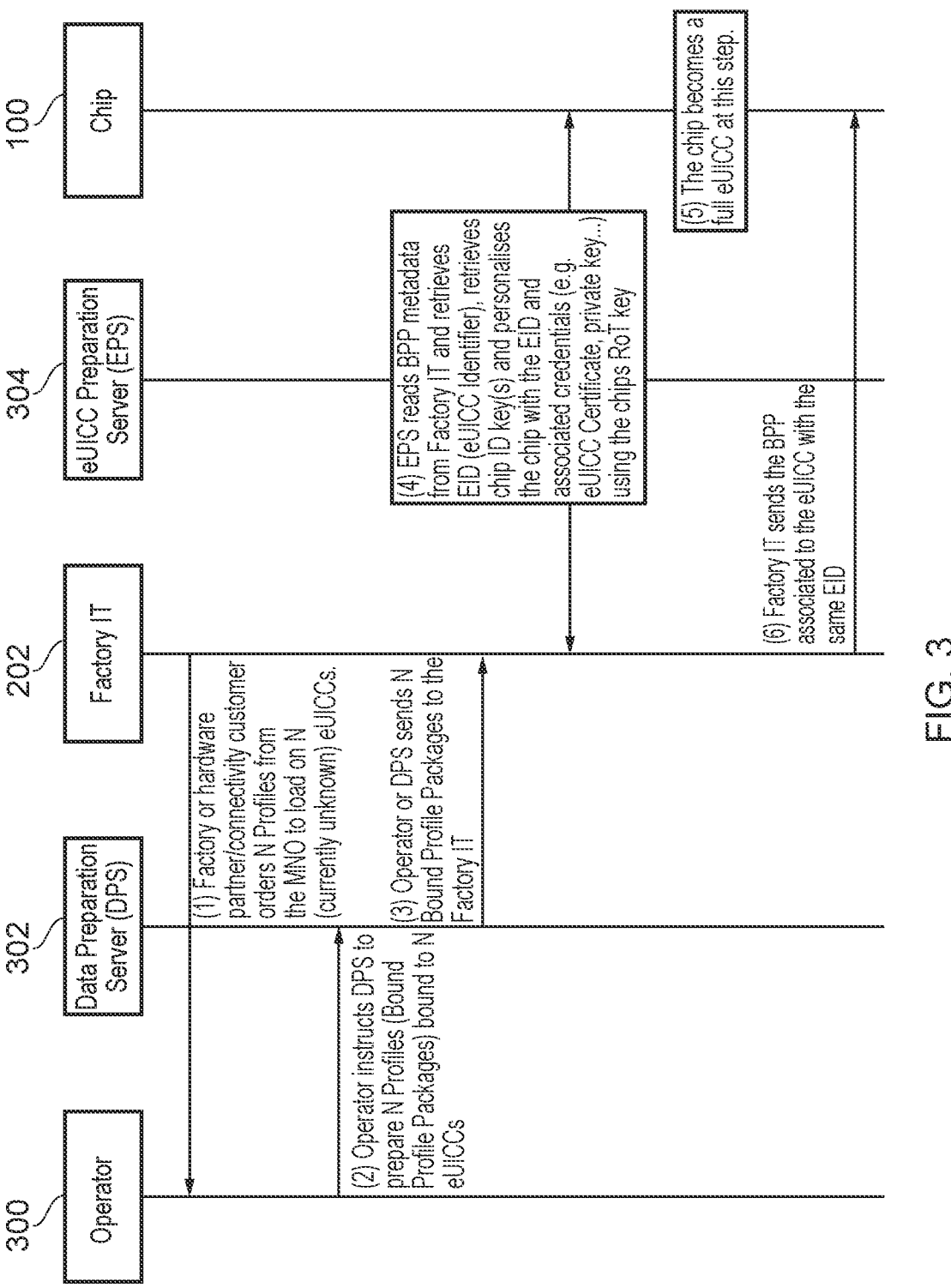

FIG. 3

100 — Chip

304 — eUICC Preparation Server (EPS)

202 — Factory IT

302 — Data Preparation Server (DPS)

300 — Operator (1) Factory or hardware partner/connectivity customer orders N Profiles from the MNO to load on N (currently unknown) eUICCs.

(2) Operator instructs DPS to prepare N Profiles (Bound Profile Packages) bound to N eUICCs (3) Operator or DPS sends N Bound Profile Packages to the Factory IT (4) EPS reads BPP metadata from Factory IT and retrieves EID (eUICC Identifier), retrieves chip ID key(s) and personalises the chip with the EID and associated credentials (e.g. eUICC Certificate, private key...) using the chips RoT key (5) The chip becomes a full eUICC at this step.

(6) Factory IT sends the BPP associated to the eUICC with the same EID

Receive plurality of BPs — 400

Decrypt each BP Using a key based on the associated ID — 604

Store decrypted BPs in secure storage — 605

Blank chip presented? — 506    N

Read chip ID — 508

Determine appropriate profile/application type — 510

Select BP of appropriate type — 512

Retrieve ID from BP — 514

Create data object with ID, credentials and BP — 616

Encrypt data object — 618

Provide data object to chip — 620

INSTALLATION OF A BOUND PACKAGE ON A SECURITY MODULE

CROSS-REFERENCE TO RELATED APPLICATION

This application claims priority to EP 22306951.9 filed Dec. 20, 2022, the entire contents of which are hereby incorporated by reference.

The present technique relates to the field of security modules.

Security modules may be associated with devices in order to control access by those devices to a service, such as access to network infrastructure provided by a network operator (e.g. in the field of telecommunications). Security modules may need to be provisioned with a subscription profile in order to authenticate to and access remote services. As an example, a Subscriber Identity Module (SIM), which may also be referred to as a Universal Integrated Circuit Card (UICC) (note, however, that the definition of the term "UICC" is no longer merely an acronym for Universal Integrated Circuit Card, but also refers to a platform, specified by ETSI, which can be used to run multiple security applications. These applications include the SIM for 2G networks, USIM for 3G, 4G and 5G networks, CSIM for CDMA, and ISIM (not to be confused with integrated SIM) for IP multimedia services), may be inserted, embedded or integrated within a device, and may be able to store more than one subscription profile, where each subscription profile is associated with a network operator and a set of credentials to control the access to the cellular network and other operator services. For example, the SIM may be a plastic card (a smart card), an embedded UICC (eUICC—note: as per GSMA Standards, an eUICC can be discreet or integrated) where the UICC is provided as a chip mounted on the circuit board of a device, or an integrated UICC (iUICC) incorporated as one of the modules within a System-on-Chip (SoC).

The organisation and structure of such security modules may be defined by certain Telecommunications Standards, for example by GSMA Standards. For example, certain Standards require a subscription profile to be bound to a particular eUICC, such that a given subscription profile is unique to that particular eUICC.

In a first example of the present technique, there is provided a method for installing a given bound package on a given security module, the method comprising:

receiving a plurality of bound packages, BPs, corresponding to a plurality of security-module identifiers, IDs, wherein each BP corresponds to a corresponding ID;

selecting, for a given security module manufactured without an associated ID, the given BP and a given ID corresponding to the given BP; and providing the given ID, a given set of credentials corresponding to the given ID, and the given BP for installation on the given security module.

In a second example of the present technique, there is provided a computer program comprising instructions which, when installed on a computer, cause the computer to perform the method as set out above. Note that the computer program may be stored on a computer-readable storage medium, which may be transitory or non-transitory.

In a third example of the present technique, there is provided an apparatus for installing a given bound package on a given security module, the apparatus comprising:

communication circuitry to receive a plurality of bound packages, BPs, corresponding to a plurality of security-module identifiers, IDs, wherein each BP corresponds to a corresponding ID;

selection circuitry to select, for a given security module manufactured without an associated ID, a given BP and a given ID corresponding to the given BP; and download control circuitry to provide the given ID, a given set of credentials corresponding to the given ID, and the given BP for installation on the given security module.

Further aspects, features and advantages of the present technique will be apparent from the following description of examples, which is to be read in conjunction with the accompanying drawings, in which:

FIG. 3 illustrates an example of the signals which might pass between different entities when installing and preparing to install BPs on security modules.

Figure 1:
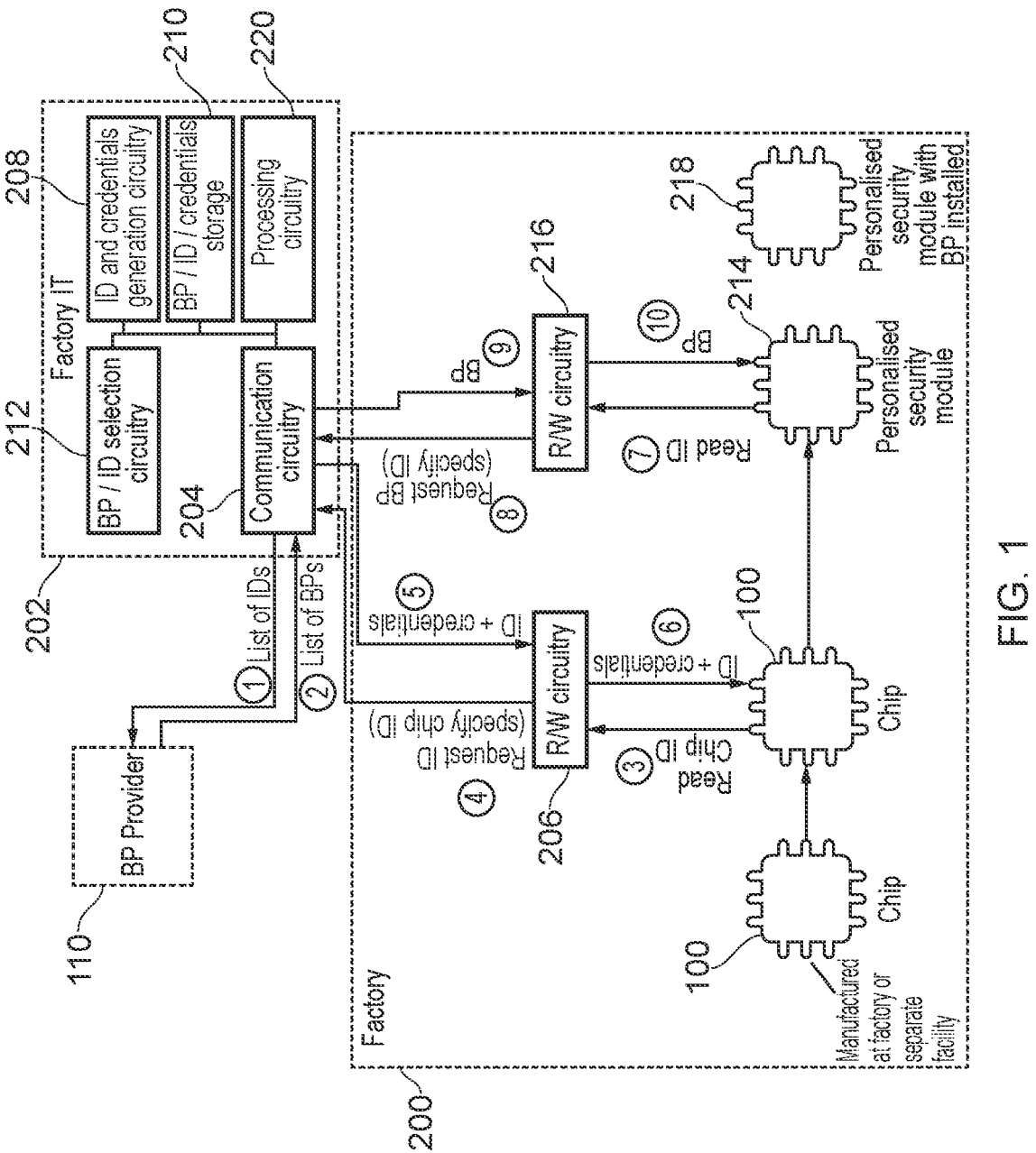
FIGS. 1 and 2 illustrate examples of the circuitry which may be provided at a factory and in factory IT, for installing bound packages (BPs) on security modules.

Before discussing example implementations with reference to the accompanying figures, the following description of example implementations and associated advantages is provided.

As set out above, a some Telecommunications Standards require subscription profiles to be bound to a particular security module (e.g. a particular UICC or eUICC). Moreover, security modules can also be used for other purposes—for example, a security module could be any smart card, secure element or embedded component—where it can also be useful for an application to be bound to a particular security module. Accordingly, the present technique considers a bound package (BP) for installation on a security module, wherein the BP is bound to a corresponding identifier (ID) of a security module.

Using a BP to install a profile/application can be advantageous, since it can help to avoid cloning (e.g. installation on more than one security module) of the profile/application, and can also be used to guarantee that the package is installed on a certified security module (e.g. a security module provided with credentials that certify its identity). However, in order to bind each BP to a particular personalised security module (e.g. a security module provided with a particular ID and an associated set of credentials), one would usually expect that this would require the ID and associated credentials to be installed on the security module before a the BP can be requested—e.g. one might expect any request for a BP to need to be sent by or on behalf of a security module which has already been personalised with an ID and credentials. This approach may work well when a single BP is being requested by a consumer (e.g. when a consumer purchases a personalised security module or a device comprising a personalised security module, and subsequently requests a BP), but may not be so suitable in a factory setting—e.g. in a factory preparing multiple security modules which have profiles/packages/applications installed on them. In particular, requiring the BP for each security module to be requested and prepared individually, in response to a request sent by or on behalf of an already personalised security module, is time consuming, and this is exacerbated by the fact that the IDs of security modules are typically discovered relatively late in the process. As a result, there may be a significant delay between discovering/installing the ID and associated credentials, and obtaining the BP (e.g. a delay during which a BP provider prepares the BP). In addition, it can be difficult for the factory to guarantee that each BP will successfully be installed in the dedicated security module personalised with the same ID.

The present technique provides an improved approach for installing BPs on security modules, which speeds up the process (particularly when installing multiple BPs on multiple security modules), in a manner that is transparent to the BP provider.

In particular, the present technique provides a method of installing a given bound package (BP) on a given security module. The method of the present technique comprises receiving a plurality of BPs corresponding to a plurality of security-module identifiers (IDs), wherein each BP corresponds to a corresponding ID. The method also includes selecting, for a given security module manufactured without an associated ID, the given BP and a given ID corresponding to the given BP. The method also includes providing the given ID, a given set of credentials corresponding to the given ID, and the given BP for installation of the given ID, the given set of credentials and the given BP on the given security module.

In accordance with the method described above, a batch of multiple IDs can created in advance (e.g. before they are needed for installation on security modules), and these are used to request a batch of BPs. Thus, a batch of BPs can be requested in advance (e.g. before each security module has been personalised with an ID and corresponding set of credentials), allowing the BPs to be prepared before or in parallel with other processes (such as manufacturing the security modules, for example). This, therefore removes much of the delay between installing the ID and credentials, and installing the BP (since much of this delay was due to waiting for the BP provider to generate a BP corresponding to the ID). Hence, the present technique can allow the process of installing BPs on multiple security modules to be accelerated.

Moreover, the method still maintains the link between each BP and it's corresponding ID, and hence makes it possible to avoid cloning of BPs, and allows the requirements of Standards such as those discussed above, which require BPs to be bound to particular IDs, to still be satisfied. In particular, from the perspective of a provider of the BPs, this process appears identical to a process where an ID and its associated credentials are installed on a security module before the BP is requested—this is because the plurality of BPs are still requested on the basis of a corresponding plurality of IDs, even though these IDs have not necessarily been installed on security modules at the time. Hence, the present technique makes it possible to speed up the process of installing BPs on multiple security modules, in a manner which maintains the link between BPs and IDs and which is invisible to the provider of the BPs.

In some examples, each BP is cryptographically linked to the corresponding ID, and the given BP cannot be successfully installed on a security module associated with an ID other than the given ID.

Some Standards require each BP to be cryptographically linked to a corresponding ID, in order to make it more difficult to install a given BP on more than one security module. Hence, by requiring each BP to be cryptographically linked to the corresponding ID in this example, the requirements of such Standards can be met. Moreover if, in a particular example, each ID is also prevented from being installed on more than one security module, then it is possible to prevent each cryptographically linked BP from being installed on more than one security module.

In some examples, the given set of credentials comprise a key created in dependence on the given ID, and the method comprises providing, to the given security module, an encrypted data object comprising the given BP, wherein the encrypted data object is encrypted using the key.

This is a particular example of how a BP can be cryptographically lined to a corresponding ID.

In some examples, the method comprises providing the given ID and the given set of credentials for installation on the given security module, wherein installation of the given ID and the given set of credentials on the given security module creates a given personalised security module, and after providing the given ID and the given set of credentials, providing the given BP for installation on the given personalised security module.

In this example, the given ID and the given set of credentials are provided for installation on the security module before the given BP is provided. For example, this may involve providing a first data object comprising the given ID and the associated credentials, and then providing a second data object comprising the BP. This is one way of implementing the present technique such that the given BP is only installed on a security module personalised with the given ID—e.g. by requiring the security module to be personalised before the given BP is provided.

In some examples, the step of receiving the plurality of BPs comprises receiving a plurality of encrypted data objects, wherein each encrypted data object comprises a corresponding BP and is encrypted using a corresponding key created in dependence on the corresponding ID. In these examples, the plurality of encrypted data objects comprise a given encrypted data object comprising the given BP, the method comprises providing, to the given personalised security module, the given encrypted data object, and the method comprises performing the steps of receiving the given encrypted data object and providing the given encrypted data object without decrypting the given encrypted data object.

In this example—which is a particular example of an implementation where the given ID and the given BP are provided separately—each BP is encrypted. For example, as in an example discussed above, this could be such that each BP is cryptographically linked to a corresponding ID. In this example, since the given BP and the given ID are provided separately (e.g. in separate data objects), there is no need to decrypt and then re-encrypt the given BP before it is provided for installation on the given security module. This reduces the amount of processing to be performed (hence reducing latency and power consumption), and also mitigates any potential security risks associated with allowing the BP to be decrypted outside of the security module.

In some examples, the method comprises creating a given data object comprising the given BP, the given ID, and the given set of credentials, and the method also comprises providing the given data object for installation on the given security module.

In this example, rather than providing the given ID and the given BP separately (e.g. in separate data objects), a single data object is generated, containing the given ID, the associated credentials and the given BP. While this may involve more processing than other examples (e.g. because the single data object needs to be generated), it may be possible to perform such processing in parallel with other processes (e.g. manufacture and/or other processing of the security module). Hence, it is possible to further speed up the process (since the number of files to be provided to the security module is reduced).

One might think that this approach would not be compliant with Standards which require each BP to be installed on a security module personalised with a corresponding ID. However, the inventors realised that this approach can still comply with such Standards, because each BP is still bound to a particular ID. Moreover, from the perspective of a provider of BPs, this approach appears identical to the other approaches discussed above, and also to approaches where the security module is personalised with a given ID before the BP is requested—this is because, like all of the examples of the present technique, this approach still involves requesting the BPs based on IDs. Hence, from the perspective of the BP provider, Standards such as those mentioned above still appear to be satisfied.

In some examples, the step of receiving the plurality of BPs comprises receiving a plurality of encrypted data objects, wherein each encrypted data object comprises a corresponding BP and is encrypted using a corresponding key created in dependence on the corresponding ID, and wherein the plurality of encrypted data objects comprises a given encrypted data object comprising the given BP. In these examples, the method comprises decrypting each encrypted data object using the corresponding key, creating a given data object comprising the given BP, the given ID, and the given set of credentials, encrypting the given data object using a given key created in dependence on a security module identifier of the given security module, and providing the encrypted given data object for installation on given security module.

In this example, in order to re-wrap the BP, ID and credentials into a single data object, the encrypted BP received from the BP provider is decrypted. However, the data object is subsequently re-encrypted and, since the data object comprises both the given BP and the given ID, the given BP is still only provided to and installed on a security module provided with the given ID.

In some examples, the step of receiving the plurality of BPs comprises receiving a plurality of activation codes, each activation code identifying an address of a server responsible for providing one of the plurality of BPs, and requesting, in dependence on a corresponding activation code, each BP.

In this example—which can be applied in combination with any of the examples described above—a BP provider sends a plurality of activation codes (ACs) in response to receiving the plurality of IDs, each identifying a corresponding BP, rather than directly providing the BPs. In this approach, the advantages described above (e.g. speeding up the process of installing BPs on multiple security modules) are still provided (e.g. because the BPs can still be prepared in advance, even if they are not necessarily sent in advance). However, this approach provides an additional advantage of reducing the number of entities which need to be certified/trusted to provide BPs to security modules.

In some examples, the method comprises storing, in storage circuitry, the plurality of BPs and the plurality of IDs and, in response to providing the given ID to the given security module, performing one of erasing the given ID from the storage circuitry, or marking, in the storage circuitry, the given ID as unavailable.

This provides a mechanism for preventing any one ID (and corresponding set of credentials) from being installed on more than one security module. In turn, this can help to prevent any given BP from being installed on more than one security module.

In some examples, installation of the given ID and the given set of credentials on the given security module creates a given personalised security module, the given BP comprises a given bound profile package, BPP, comprising a subscription profile for installation on the given security module, and the given personalised security module comprises a UICC.

There are multiple examples of situations in which it may be beneficial to provide a profile, application or similar for installation on a security module such that it is bound to a particular ID. In this example, the security module is a UICC, and the BP is a BPP. For example, this could be a UICC to be used for telecommunications, and hence the installation of the BPP on the UICC may be governed by Telecommunications Standards such as the GSMA Standards discussed above. Thus, the present technique may be particularly beneficial in this example.

In some examples, the UICC comprises one of an embedded and/or integrated UICC, or an operating system loaded within or providing a trusted execution environment, TEE.

These are particular examples of UICCs, on which BPPs may be installed in accordance with examples of the present technique.

In some examples, installation of the given ID and the given set of credentials on the given security module creates a given personalised security module, and the given BP comprises a given bound application package comprising an application for installation on the given security module.

While the BP may be a BPP in examples such as those discussed above, there are many other situations in which it can to provide a BP that is bound to a given ID. In this particular example, for instance, the BP comprises an application for installation on the given security module.

In some examples the given personalised security module comprises one of a secure element for payment, wherein the application comprises a payment application, and a secure element for providing an identity document, wherein the application comprises an identity profile.

In these examples, while installation of a payment application or an identity profile may not be governed by the Telecommunications Standards mentioned above, it can still be useful to provide a mechanism to prevent a given payment application or identity profile from being installed on multiple secure elements. Hence, the present technique can also be useful in these examples. For example, a payment application can be installed to allow a device, provided with the security module, to make payments (e.g. to make contactless payments in place of a credit or debit card). An identity profile can, for example, provide an electronic form or an identity document, such as a driving license, passport or other identify document.

Any of the above examples may also be performed by a computer, under the control of instructions of a computer program. This computer program may be stored on a transitory or non-transitory computer-readable storage medium, and—by virtue of controlling a computer to perform the same method—provides the same technical effects as the methods described above.

Moreover, an apparatus may also be provided, which comprises circuitry configured to perform the method steps described in any one of the examples described above.

Particular embodiments will now be described with reference to the figures.

The present technique relates to the installation of BPs on security modules, wherein the security modules are usable as—for example—smart cards, secure elements or embedded components. An example of how the present technique may be implemented in a factory 200 is illustrated in FIG. 1.

In FIG. 1, a security module 100 is personalised in a factory 200 (also referred to as a security module preparation location/area). The security module preparation area 200 could be a dedicated facility which receives chips or items with chips embedded in them, and personalises the chips by installing an ID, credential and a BP. Alternatively, the security module preparation area 200 may also be responsible for one or both of manufacturing the chip itself and manufacturing a device that the chip is embedded or inserted into.

FIG. 1 also shows circuitry referred to as "factory IT" 202. Some or all of the components of the factory IT may be provided at the same facility as the security module preparation location 200, or may be a separate facility. The factory IT 202 includes communication circuitry 204, which is configured to communicate with a BP provider 110 (e.g. this could be a mobile network operator (MNO), in an example where the BPs are bound profile packages (BPPs) for installation on UICCs), and with read/write circuitry 206 within the security module preparation location 200. Note that, if the factory IT 202 is provided at a different location to the factory 200, additional communication circuitry (not shown) may also be provided between the communication circuitry 204 of the factory IT and the read/write circuitry 206, 216 at the factory 200. Note that, while two separate instances of read/write circuitry 206, 216 are illustrated in FIG. 1, this is not essential, and there could instead be a single instance of read/write circuitry which performs the functions of both instances shown in the figure. Moreover, the read/write circuitry may also be referred to as download control circuitry (because it controls the download of data onto security modules).

FIG. 1 illustrates the following numbered steps, in an example of a process according to the present technique:

1. The communication circuitry 204 sends, to the BP provider 110, a list of IDs. The list of IDs is provided as part of a request for the BP provider to prepare a set of BPs corresponding to (bound to) the list of IDs. These are IDs that are for installation on security modules in the future, but are not currently installed on or assigned to physical security modules/chips. The IDs are created by ID and credentials generation circuitry 208. Note that the credentials will depend on various factors including, but not limited to, the intended use of the security module. For example, in the case of a UICC, the credentials could include information—such as a certificate—to certify the UICC's identity during communications between the UICC and a mobile network operator (MNO), and may also include an encryption key (e.g. to encrypt the BP—as discussed in examples below).

2. In this example, the BP provider 110 responds to the request by sending a list of BPs (e.g. one BP for each ID) back to the communication circuitry 204. The list of BPs, along with the IDs and credentials, are then stored in storage circuitry 210 of the factory IT. Note that, in a modification of this example discussed below, a list of activation codes (ACs) may be sent to the communication circuitry 204 at this step.

3. In the security module preparation location 200, the first read/write circuitry 206 reads the chip ID of a security module 100. Note that this step may be performed before, after or in parallel with one or both of steps 1 and 2.

4. The read/write circuitry provides the chip ID to the communication circuitry 204. Based on the chip ID, BP/ID selection circuitry 212 selects a suitable BP, and reads, from the BP, a corresponding ID for installation on the chip.

5. The communication circuitry 204 sends the ID and the associated credentials to the read/write circuitry 206.

6. The read/write circuitry 206 then writes the ID and the credentials to the chip. The chip then installs the ID and credentials, creating a personalised security module 214.

7. Next, read/write circuitry 216 (which may be the same read/write circuitry 206 as discussed above, or may be separate read/write circuitry) reads the ID of the personalised security module 214.

8. The read/write circuitry provides the ID to the communication circuitry, and the BP/ID selection circuitry identifies the BP corresponding to the ID. Note: it is possible for steps 7 and 8 to be omitted in some examples—for example, the BP may be sent immediately after the ID and credentials are sent, without needing to read the ID from the chip (e.g. it may be assumed that the chip currently at the read/write circuitry is the same as the chip that just received an ID and credentials).

9. The communication circuitry provides the BP to the read/write circuitry.

10. The read/write circuitry writes the BP to the personalised security module, and the personalised security module installs the BP to create a personalised security module 218 on which a BP is installed.

The process described above and illustrated in FIG. 1 allows the step of retrieving the BP for each of a plurality of security modules to be performed earlier in the process (e.g. as soon as a list of IDs has been generated or otherwise obtained), rather than delaying this step until the ID has been installed on the security module. Hence, although this particular example still involves installing an ID and credentials (step 6) before a BP can be installed (step 10), the BP can be retrieved directly from the storage circuitry 210, and hence there is no need to send a request to the BP provider 110 and await a response. This, therefore, reduces the delay between installing an ID on the security module and obtaining a corresponding BP to be installed on the security module (e.g. because the BP has already been prepared, and can be retrieved from the storage circuitry 210 provided within/accessible to the Factory IT, rather than being requested from the BP provider 110). Hence, the time required to perform the entire process can be reduced. In addition, the process shown in FIG. 1 allows a batch of multiple BPs to be requested at once, which further speeds up the process.

Another advantage of this approach is that, when used for the installation of bound profile packages (BPPs) on universal integrated circuit cards (UICCs), this process fits within the GSMA Standards mentioned above. In particular, this approach still requires each BP (or BPP, in a particular example) to be bound to a particular ID, by requesting the plurality of BPs based on the list of IDs, and further by installing the ID and credentials on the security module before obtaining and installing the BP. Hence, this method is faster, while still satisfying the requirements of the GSMA Standards.

Note that, in a modification of this example, the BP provider may, in response to receiving the list of IDs, return a list of activation codes (ACs). In this case, the BPs are still prepared in response to the list of IDs, but are stored on a server operated by the BP provider rather than being provided to the factory IT. Each AC then identifies a corresponding BP and information about (e.g. an address of) its storage location. In this modified example, the BP/ID selection circuitry 212 is replaced with AC/ID selection circuitry, which selects an ID for the security module and identifies a corresponding AC. The AC is then parsed, by the communication circuitry 204, to contact the BP provider 110 (or a server operated by the BP provider), which returns the corresponding BP. Steps 9 and 10 are then performed as discussed above.

This modified approach provides still provides the advantages of speeding up the process of installing BPs on multiple security modules (e.g. because the plurality of BPs can still be generated in advance), while still satisfying the appropriate Standards (e.g. the GSMA Standards allow a BP provider to provide an AC in response to an ID, and to subsequently respond to receiving an AC by sending a BP). Moreover, this approach provides an additional advantage of avoiding a need for individual profile license agreements between the BP provider and the factory IT and/or the security module preparation location.

Figure 2:
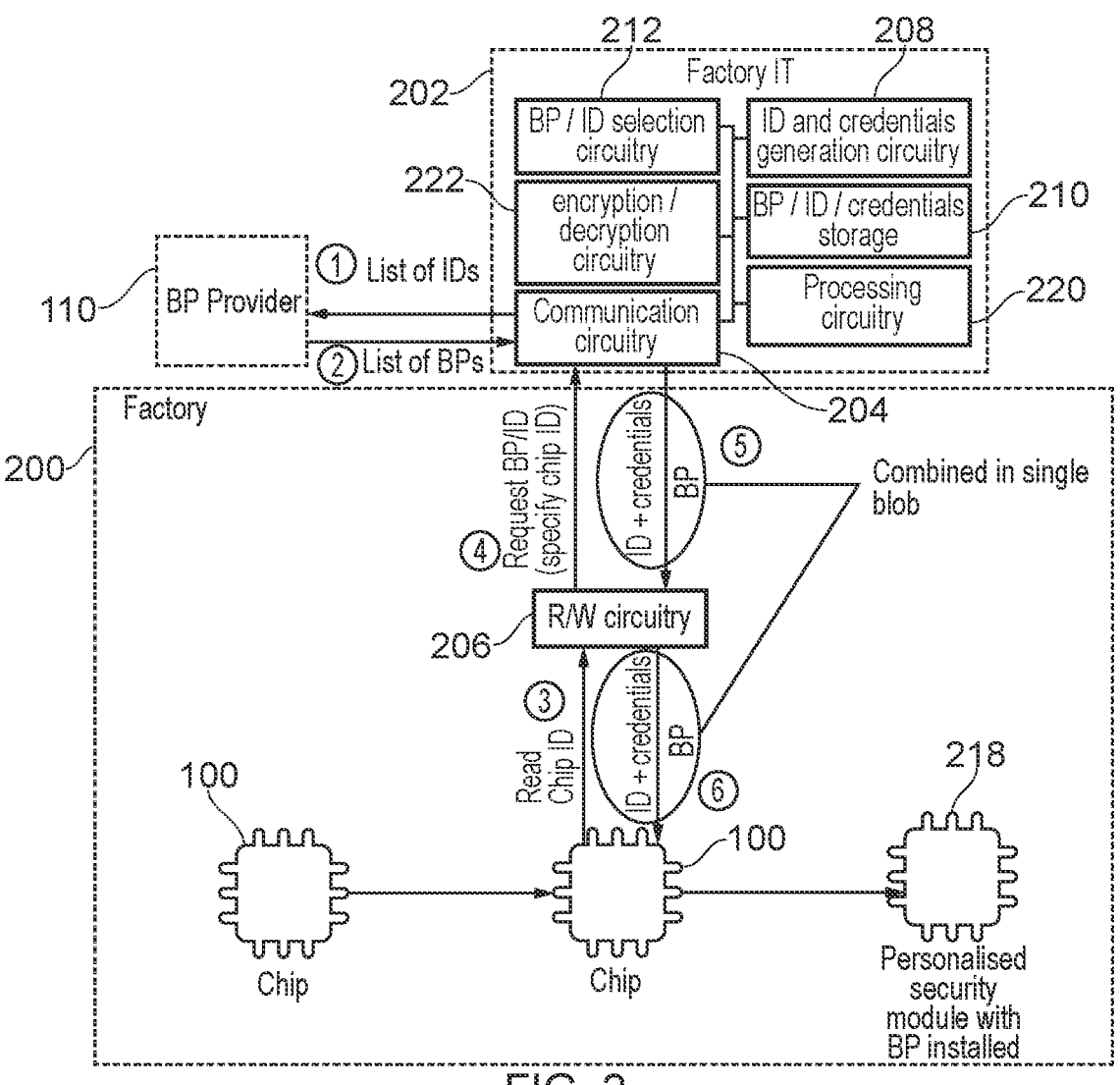

FIG. 2 illustrates another example of a process for installing BPs on security modules 100. In particular, the process shown in FIG. 2 is performed using the same circuitry (except that the second read/write circuitry 216 is not used) as the process shown in FIG. 1. In addition, steps 1 to 3 of the process shown in FIG. 2 are the same as steps 1 to 3 of the process shown in FIG. 1.

The process shown in FIG. 2 differs from that shown in FIG. 1, in that the request sent to the communication circuitry 204 in step 4 is a request for both a BP and an ID (rather than being a request for just an ID). However, it will be appreciated that the request itself could be identical to that in step 4 of FIG. 1, with the communication circuitry 204 simply responding in a different way (i.e. by providing both a BP and an ID, rather than just a ID).

The selection circuitry 212 then selects an ID and a corresponding BP for installation on the security module, and processing circuitry 220 generates a single data object (e.g. a single "blob," where the term "blob" is an acronym for binary large object). This blob is then provided (step 5), by the communication circuitry 204, to the read/write circuitry 206, which provides (step 6) the blob to the security module 100 for installation on the security module.

Like the approach shown in FIG. 1, the approach in FIG. 2 reduces the time taken to personalise a security module, by allowing a batch of BPs to be requested in advance. Moreover, by providing the ID, credentials and BP as a single blob, it is possible to further speed up the process. Moreover, this approach still satisfies the GSMA Standards, because each BP is still tied to a specific ID, and can still only be installed on a security module provided with the corresponding BP.

Each BP may be bound to a corresponding ID by being cryptographically linked with that ID. This may, for example, mean that a given BP is encrypted, by the BP provider 110, with an encryption key that is dependent on the ID (for example, one of the credentials associated with the ID might be the encryption key or keys used to encrypt the BP).

In the example of FIG. 1, if the BP is encrypted, there is no need for the factory IT to decrypt it, provided that either the security module preparation location 200 or the security module itself is provided with the encryption key (which will be the case if the credentials include the encryption key). However, in the example of FIG. 2, the factory IT is optionally provided with encryption/decryption circuitry 222, to decrypt the BPs it receives. This allows the blob to be generated based on an unencrypted BP, and the blob can then be re-encrypted before being provided to the security module. Note that the encryption/decryption circuitry 222 may be located in a secure area which is SAS certified—e.g. the factory itself may not be secure by default.

This might seem counter-intuitive, at least in the context of telecommunications, given that some Standards require the BP to be cryptographically bound to a corresponding ID at the point of delivery to the security module. However, the inventors realised that, provided the blob is re-encrypted before it is provided to the security module, this requirement is still fulfilled from the perspective of the BP provider. Indeed, the processes discussed with reference to FIGS. 1 and 2 are, from the perspective of the BP provider 110, identical.

In a modification of this example—similar to the modification discussed above with reference to FIG. 1—the BP provider may respond to receiving the list of IDs by returning a list of activation codes (ACs). In this modified example, the BP/ID selection circuitry 212 is replaced with AC/ID selection circuitry, which selects an ID for the security module and identifies a corresponding AC. The AC is then sent, by the communication circuitry 204, to the BP provider 110 (or a server operated by the BP provider), which returns the corresponding BP to the communication circuitry. The processing circuitry then creates the blob containing the ID, credentials and BP, and steps 5 and 6 are performed as discussed above.

FIG. 3 is another illustration of the method shown in FIG. 1, as it applies to the installation of a BPP on a UICC. In FIG. 3, the BP provider is an operator 300 (e.g. a mobile network operator, MNO) which operates a data preparation server (DPS) 302. The security module preparation location provides, in this example, an eUICC preparation server (EPS) 304.

FIG. 3 shows the following steps, which correspond with the steps shown in FIG. 1:

1. The factory IT 202 requests N profiles, corresponding to N eUICC IDs (EIDs). N is an integer which is greater than 1.
2. The operator 300 instructs the DPS 302 to provide N BPPs to the factory IT, each BPP being bound to a corresponding EID.
3. The DPS then sends the N BPPs to the factory IT (optionally, steps 2 and 3 may be replaced with a single step, in which the operator sends the BPPs directly to the factory IT).
4. At a later stage, the EPS 304—optionally after reading the chip ID of a chip to be personalised—reads BPP metadata (e.g. this may include some (public) keys, which may be used (with the eUICC's own private keys) by the eUICC to decrypt the BPP) provided by the factory IT, in order to identify an appropriate BPP for the chip, and to determine the EID corresponding to that BPP. The EPS then provides the EID and associated credentials to the chip.
5. The chip 100 installs the received EID and credentials, at which point it becomes a full (e.g. personalised) eUICC.
6. The factory IT then sends the associated BPP, either directly or via the EPS, to the eUICC.

As noted above, this process corresponds with the process shown in FIG. 1, since the EID and BPP are sent to the chip separately (e.g. the chip is personalised with an EID before it receives the BPP). However, it will be appreciated that at least steps 1 to 3 of the process shown in FIG. 3 also apply to the example shown in FIG. 2, and steps 4 to 6 can be modified to correspond with those in FIG. 2.

Note that the DPS may also send some keys along with (or as part of) the BPP. For example, the DPS may also send some DH (Diffie-Hellman) parameters.

Figure 4:
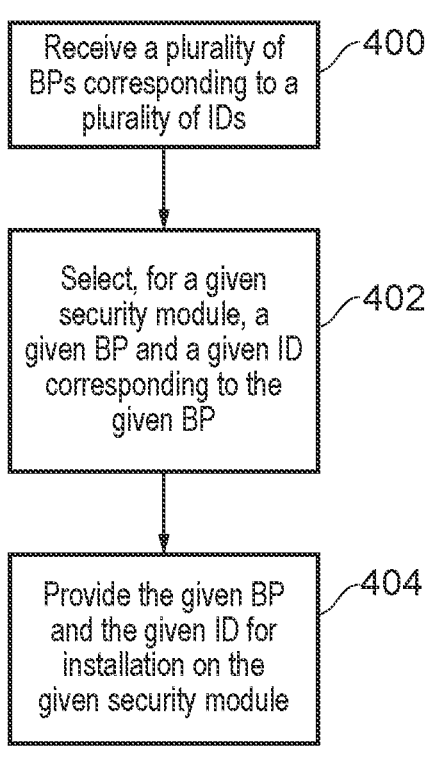
FIGS. 4, 5, and 6 are flow diagrams illustrating methods of installing BPs on security modules.

FIG. 4 is a flow diagram illustrating a method according to the present technique. The method shown in FIG. 4 may be performed by, for example, the factory IT described above.

The method includes receiving, at step 400, a plurality of BPs corresponding to a plurality of IDs. In step 402, the method includes selecting, for a given security module, a given ID corresponding to a given BP for installation on the given security module. In step 404, the method involves providing the given ID, a set of credentials corresponding to the given ID, and the given BP for installation on the given security module.

Figure 5:
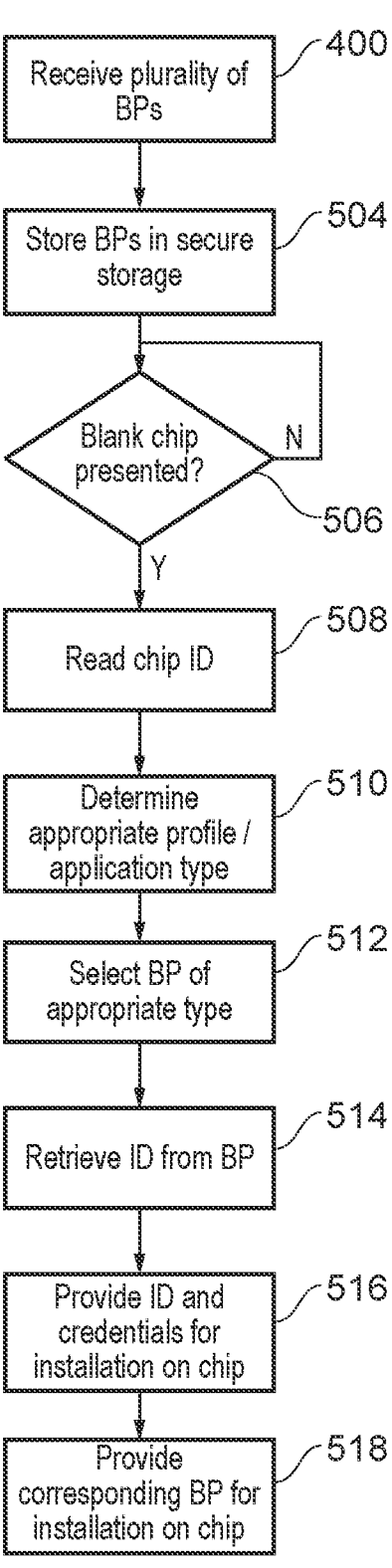

FIG. 5 is another flow diagram, showing a particular example of the method shown in FIG. 4. In particular, the method shown in FIG. 5 includes the following steps:

Step 400: receive a plurality of BPs (including associated BP metadata)—these correspond with a plurality of IDs, as in the example shown in FIG. 4. Note that each BP may be encrypted using an encryption key dependent on the corresponding ID.

Step 504: Store the plurality of BPs in some security storage circuitry—for example, this might be storage circuitry accessible to the factory IT.

Step 506: It is determined whether a blank chip (e.g. a security module which has not yet had an ID, credentials and BP installed on it) has been presented. The method proceeds to step 508 when it is determined that a blank chip has been presented.

Step 508: The chip ID (which is an identifier associated with the chip at the time it is manufactured, and is different to the ID to be installed in this method) is read.

Step 510: An appropriate type of profile/application is identified, dependent on the chip ID.

Step 512: A BP (e.g. one of the BPs stored in the secure storage circuitry) comprising a profile/application of the determined appropriate type is selected.

Step 514: The ID to which the BP is bound is extracted/determined from the BP (or, more particularly, from the BP metadata).

Step 516: The ID and associated credentials are provided for installation on the chip. This creates a personalised chip.

Step 518: After the chip has been personalised with the ID and credentials, the selected BP is provided for installation on the personalised chip.

Figure 6:
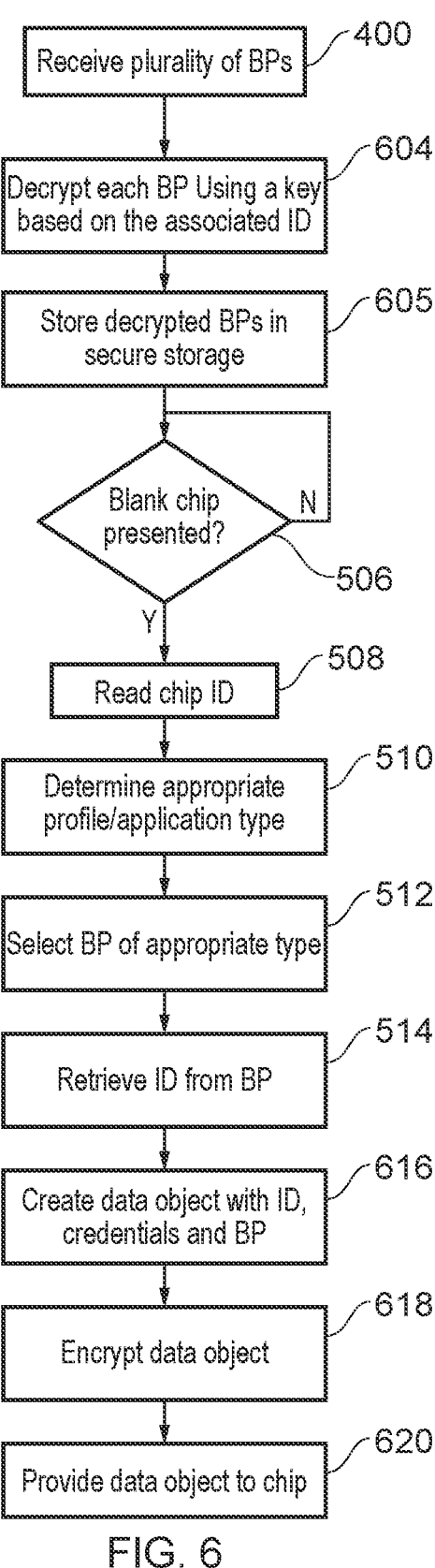

FIG. 6 is another flow diagram, showing another example of the method shown in FIG. 4. In particular, the method shown in FIG. 6 includes steps 400, and 506-514 as in the method of FIG. 5. However, step 504 is replaced with a step 604 of decrypting each BP using an encryption key based on the corresponding ID, and a step 605 of storing the decrypted BPs in the secure storage circuitry. However, note that if the BPs are not encrypted, steps 604 and 605 in FIG. 6 can be replaced with step 504 from FIG. 5.

In addition, the method shown in FIG. 6 includes the following steps, in place of steps 516-518 in FIG. 5:

Step 616: A data object (e.g. a blob) is created, comprising the ID, the associated credentials, and the corresponding BP.

Step 618: The data object is encrypted.

Step 620: The encrypted data object is provided for installation of the ID, credentials and BP on the security module.

By implementing any one of the methods described above, it becomes possible to request a plurality of BPs for IDs which have not yet been installed on security modules.

This allows the preparation of the BPs to begin earlier, and hence reduces the delay when, at a later stage in production, an ID is installed on a given security module, and a corresponding BP is requested.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Further, the words "comprising at least one of . . . " are used in the present application to mean that any one of the following options or any combination of the following options is included. For example, "at least one of: A; B and C" is intended to mean A or B or C or any combination of A, B and C (e.g. A and B or A and C or B and C).

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. A method for installing a given bound package on a given security module, the method comprising:

receiving a plurality of bound packages (BPs) corresponding to a plurality of security-module identifiers (IDs) wherein each BP corresponds to a corresponding security-module ID, wherein a given BP is received in advance of installation of a given security-module ID, corresponding to the given BP, on a security module;

selecting, for a given security module manufactured without an associated security-module ID, the given BP and a given security-module ID corresponding to the given BP; and following receipt of the given BP, providing the given security-module ID, a given set of credentials corresponding to the given ID, and the given BP for installation on the given security module.

2. The method as claimed in claim 1, wherein:

each BP is cryptographically linked to the corresponding security-module ID; and the given BP cannot be successfully installed on a security module associated with a security-module ID other than the given security-module ID.

3. The method as claimed in claim 2, wherein:

the given set of credentials comprise a key created in dependence on the given security-module ID; and the method comprises providing, to the given security module, an encrypted data object comprising the given BP, wherein the encrypted data object is encrypted using the key.

4. The method as claimed in claim 1, comprising:

providing the given security-module ID and the given set of credentials for installation on the given security module, wherein installation of the given security-module ID and the given set of credentials on the given security module creates a given personalised security module; and after providing the given security-module ID and the given set of credentials, providing the given BP for installation on the given personalised security module.

5. The method of claim 4, wherein:

the step of receiving the plurality of BPs comprises receiving a plurality of encrypted data objects, wherein each encrypted data object comprises a corresponding BP and is encrypted using a corresponding key created in dependence on the corresponding ID;

the plurality of encrypted data objects comprise a given encrypted data object comprising the given BP;

the method comprises providing, to the given personalised security module, the given encrypted data object; and the method comprises performing the steps of receiving the given encrypted data object and providing the given encrypted data object without decrypting the given encrypted data object.

6. The method as claimed in claim 1, comprising:

creating a given data object comprising the given BP, the given ID, and the given set of credentials; and providing the given data object for installation on the given security module.

7. The method as claimed in claim 6, wherein:

the step of receiving the plurality of BPs comprises receiving a plurality of encrypted data objects, wherein each encrypted data object comprises a corresponding BP and is encrypted using a corresponding key created in dependence on the corresponding ID;

the plurality of encrypted data objects comprises a given encrypted data object comprising the given BP; and the method comprises:

decrypting each encrypted data object using the corresponding key;

creating a given data object comprising the given BP, the given ID, and the given set of credentials;

encrypting the given data object using a given key created in dependence on a security module identifier of the given security module; and providing the encrypted given data object for installation on the given security module.

8. The method as claimed in claim 1, wherein the step of receiving the plurality of BPs comprises:

receiving a plurality of activation codes, each activation code identifying an address of a server responsible for providing one of the plurality of BPs; and requesting, in dependence on a corresponding activation code, each BP.

9. The method as claimed in claim 1, comprising:

storing, in storage circuitry, the plurality of BPs and the plurality of security-module IDs; and in response to providing the given security-module ID to the given security module, performing one of:

erasing the given security-module ID from the storage circuitry; or marking, in the storage circuitry, the given security-module ID as unavailable.

10. The method as claimed in claim 1, wherein:

installation of the given security-module ID and the given set of credentials on the given security module creates a given personalised security module;

the given BP comprises a given bound profile package, BPP, comprising a subscription profile for installation on the given security module; and the given personalised security module comprises a Universal Integrated Circuit Card.

11. The method as claimed in claim 10, wherein the UICC comprises one of:

a discrete or integrated embedded Universal Integrated Circuit Card; or an operating system loaded within or providing a trusted execution environment, TEE.

12. The method as claimed in claim 1, wherein:

installation of the given security-module ID and the given set of credentials on the given security module creates a given personalised security module; and the given BP comprises a given bound application package comprising an application for installation on the given security module.

13. The method as claimed in claim 12, wherein one of:

the given personalised security module comprises a secure element for payment, and the application comprises a payment application; or the given personalised security module comprises a secure element for providing an identity document, and the application comprises an identity profile.

14. A non-transitory storage medium storing computer program comprising instructions which, when executed on a computer, cause the computer to perform the method as claimed in claim 1.

15. An apparatus for installing a given bound package on a given security module, the apparatus comprising:

communication circuitry configured to receive a plurality of bound packages (BPs) corresponding to a plurality of security-module identifiers (IDs) wherein each BP corresponds to a corresponding ID, wherein the communication circuitry is configured to receive a given BP in advance of installation of a given ID, corresponding to the given BP, on a security module;

selection circuitry configured to select, for a given security module manufactured without an associated ID, the given BP and the given security-module ID corresponding to the given BP; and download control circuitry configured to provide, following receipt of the given BP by the communication circuitry, the given ID, a given set of credentials corresponding to the given ID, and the given BP for installation on the given security module.

* * * * *